(12) United States Patent
Kim et al.

(10) Patent No.: US 8,660,544 B2
(45) Date of Patent: Feb. 25, 2014

(54) MOBILE TERMINAL, METHOD OF DISPLAYING DATA THEREIN AND METHOD OF EDITING DATA THEREIN

(75) Inventors: Jin Tae Kim, Seoul (KR); Jin Ho Son, Seoul (KR)

(73) Assignee: LG Electronics Inc., Seoul (KR)

( * ) Notice: Subject to any disclaimer, the term of this patent is extended or adjusted under 35 U.S.C. 154(b) by 858 days.

(21) Appl. No.: 12/233,471

(22) Filed: Sep. 18, 2008

(65) Prior Publication Data

US 2009/0088143 A1  Apr. 2, 2009

(30) Foreign Application Priority Data

Sep. 19, 2007  (KR) ........................ 10-2007-0095278

(51) Int. Cl.
 *H04M 3/00* (2006.01)
(52) U.S. Cl.
 USPC ........ 455/418; 455/566; 455/414.1; 455/466; 455/556; 345/173; 345/473; 345/157; 345/723
(58) Field of Classification Search
 USPC ........ 455/418, 566, 456.1; 345/173, 473, 702
 See application file for complete search history.

(56) References Cited

U.S. PATENT DOCUMENTS

| | | | |
|---|---|---|---|
| 5,825,352 A * | 10/1998 | Bisset et al. | 345/173 |
| 6,400,378 B1 | 6/2002 | Snook | |
| 7,242,847 B1 | 7/2007 | Davies et al. | |
| 7,312,791 B2 * | 12/2007 | Hoshino et al. | 345/173 |
| 7,519,223 B2 * | 4/2009 | Dehlin et al. | 382/203 |
| 7,856,605 B2 * | 12/2010 | Ording et al. | 715/856 |
| 7,889,184 B2 * | 2/2011 | Blumenberg et al. | 345/173 |
| 2003/0231168 A1 * | 12/2003 | Bell et al. | 345/173 |
| 2005/0046621 A1 * | 3/2005 | Kaikuranta | 345/173 |
| 2006/0026521 A1 * | 2/2006 | Hotelling et al. | 715/702 |
| 2007/0146340 A1 | 6/2007 | Webb | |
| 2008/0122796 A1 * | 5/2008 | Jobs et al. | 345/173 |
| 2008/0178087 A1 * | 7/2008 | Fitzgibbon et al. | 715/723 |
| 2009/0058830 A1 * | 3/2009 | Herz et al. | 345/173 |

FOREIGN PATENT DOCUMENTS

| | | |
|---|---|---|
| CN | 1609993 | 4/2005 |
| EP | 0801390 | 10/1997 |
| JP | 2004-235913 | 8/2004 |
| KR | 10-2006-0016527 | 2/2006 |
| WO | 2006/135358 | 12/2006 |

OTHER PUBLICATIONS

Douglas Dixon, "New Editing Techniques with Adobe Premiere Pro", Jan. 2004, XP-002338454.

* cited by examiner

*Primary Examiner* — Kiet Doan
*Assistant Examiner* — Michael T Vu
(74) *Attorney, Agent, or Firm* — Lee, Hong, Degerman, Kang & Waimey (57) ABSTRACT

A mobile terminal, method of displaying data therein and method of editing data therein are disclosed, by which an alignment sequence of data can be changed. The present invention includes a touchscreen displaying a first data and a second data thereon and a controller, if the second data is touched and dragged to the first data, the controller generating a single data file using the first and second data in a specific sequence based on a dragged position of the second data.

8 Claims, 9 Drawing Sheets

MOBILE TERMINAL, METHOD OF DISPLAYING DATA THEREIN AND METHOD OF EDITING DATA THEREIN

This application claims the benefit of the Korean Patent Application No. 10-2007-0095278, filed on Sep. 19, 2007, which is hereby incorporated by reference as if fully set forth herein.

BACKGROUND OF THE INVENTION

1. Field of the Invention

The present invention relates to a mobile terminal, and more particularly, to a mobile terminal, method of displaying data therein and method of editing data therein. Although the present invention is suitable for a wide scope of applications, it is particularly suitable for changing an alignment sequence of data or editing data by dragging the data.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Moreover, a mobile terminal is able to align data or edit stored data for user's convenience. And, many efforts are made to research and develop a mobile terminal capable of facilitating the data alignment or editing.

SUMMARY OF THE INVENTION

Accordingly, the present invention is directed to a mobile terminal, method of displaying data therein and method of editing data therein that substantially obviate one or more problems due to limitations and disadvantages of the related art.

An object of the present invention is to provide a mobile terminal, method of displaying data therein and method of editing data therein, by which an alignment sequence of data can be changed.

Another object of the present invention is to provide a mobile terminal, method of displaying data therein and method of editing data therein, by which data can be edited by being dragged.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen displaying a first data and a second data thereon and a controller, if the second data is touched and dragged to the first data, the controller generating a single data file using the first and second data in a specific sequence based on a dragged position of the second data.

In another aspect of the present invention, a mobile terminal includes a touchscreen displaying a first data and a controller generating a single data file by inserting a second data in a selected point of the first data.

In another aspect of the present invention, a mobile terminal includes a touchscreen displaying data and a controller, if the displayed data is touched and dragged, the controller controlling an alignment sequence of the data to be changed.

In another aspect of the present invention, a method of editing data in a mobile terminal includes the steps of displaying a first data and a second data thereon, detecting that the second data is touched and dragged to the first data, and generating a single data file using the first and second data in a specific sequence based on a dragged position of the second data.

In another aspect of the present invention, a method of editing data in a mobile terminal includes the steps of displaying a first data, selecting a specific point of the first data, and generating a single data file by inserting a second data in the selected specific point.

In a further aspect of the present invention, a method of displaying data in a mobile terminal includes the steps of displaying data and if the displayed data is touched and dragged, changing an alignment sequence of the data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
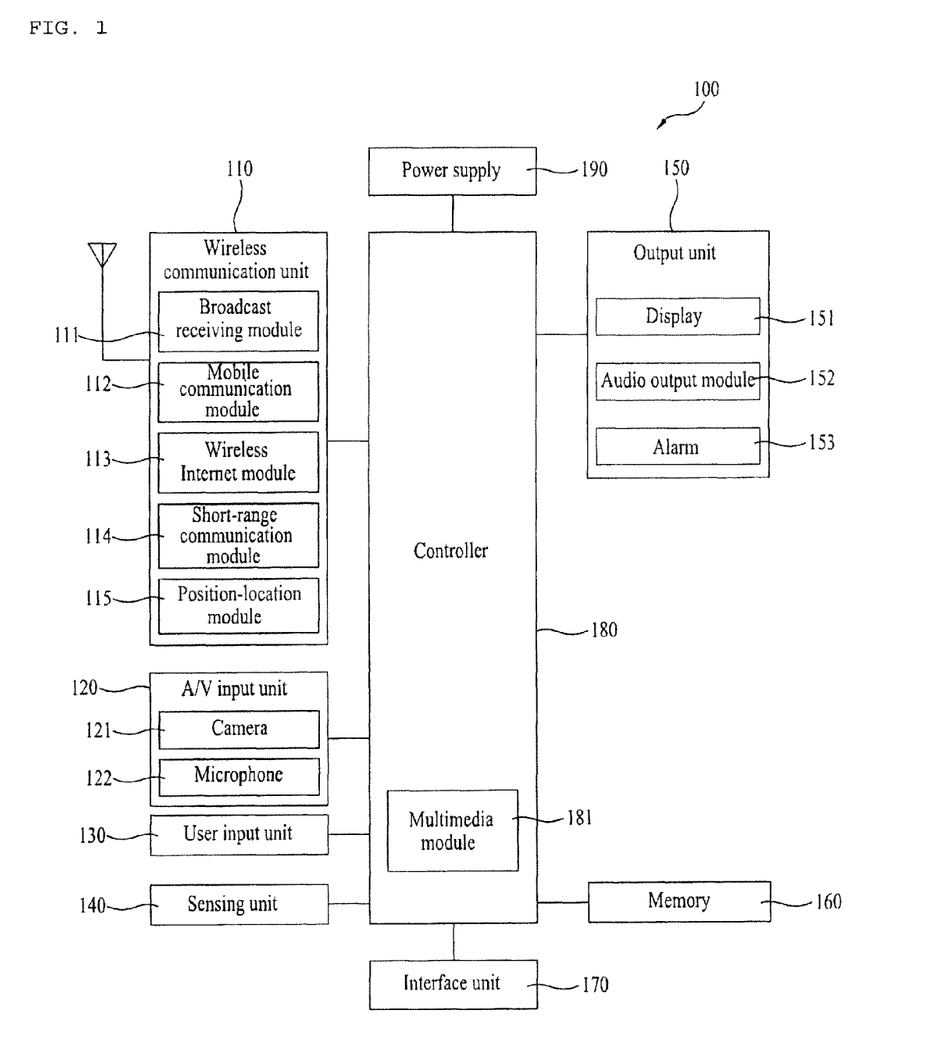
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
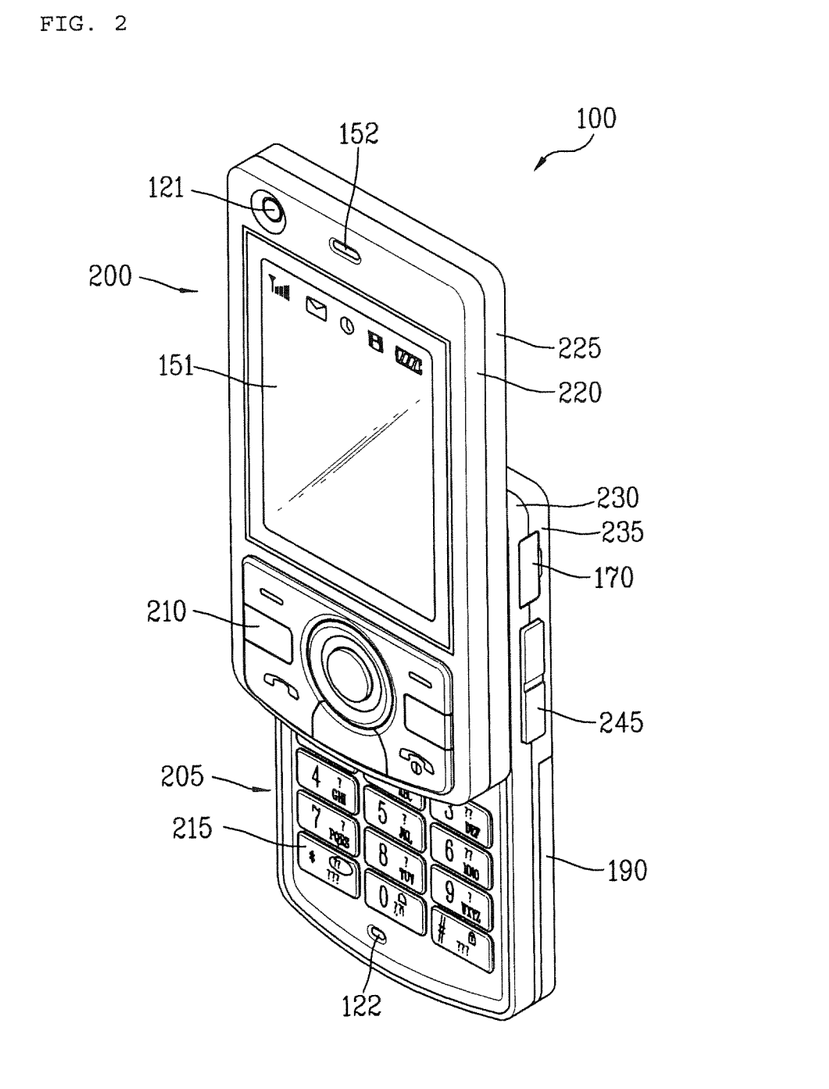
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
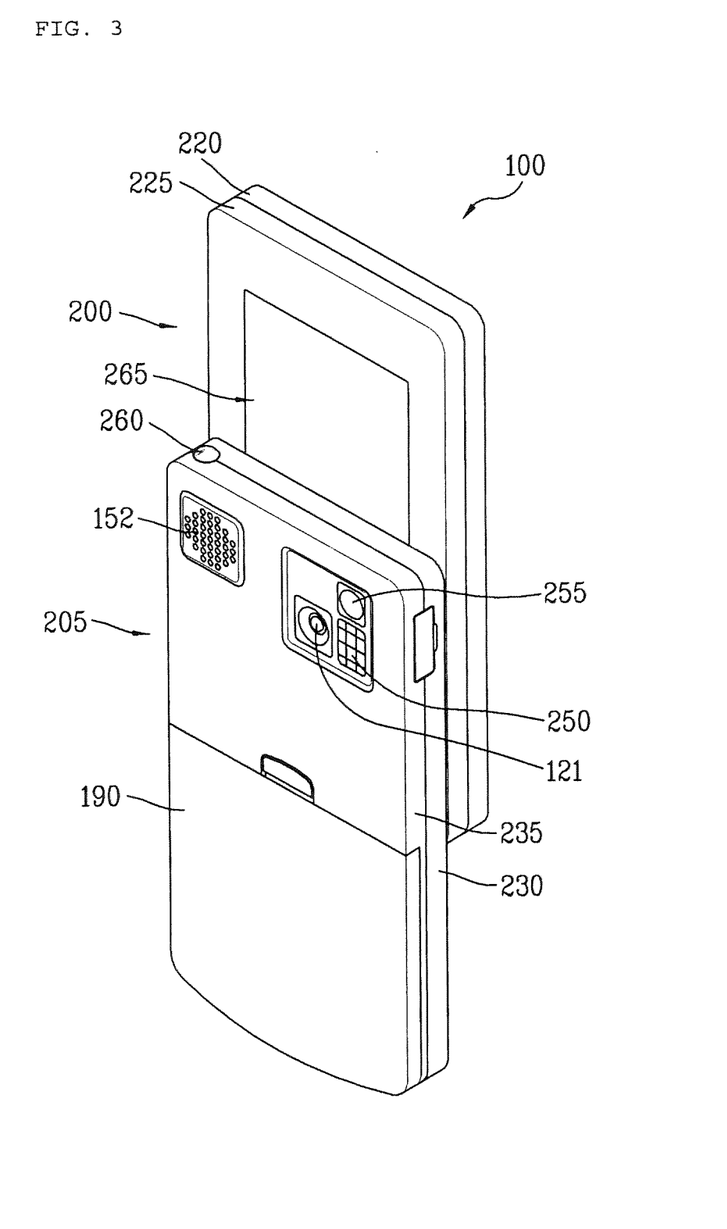
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
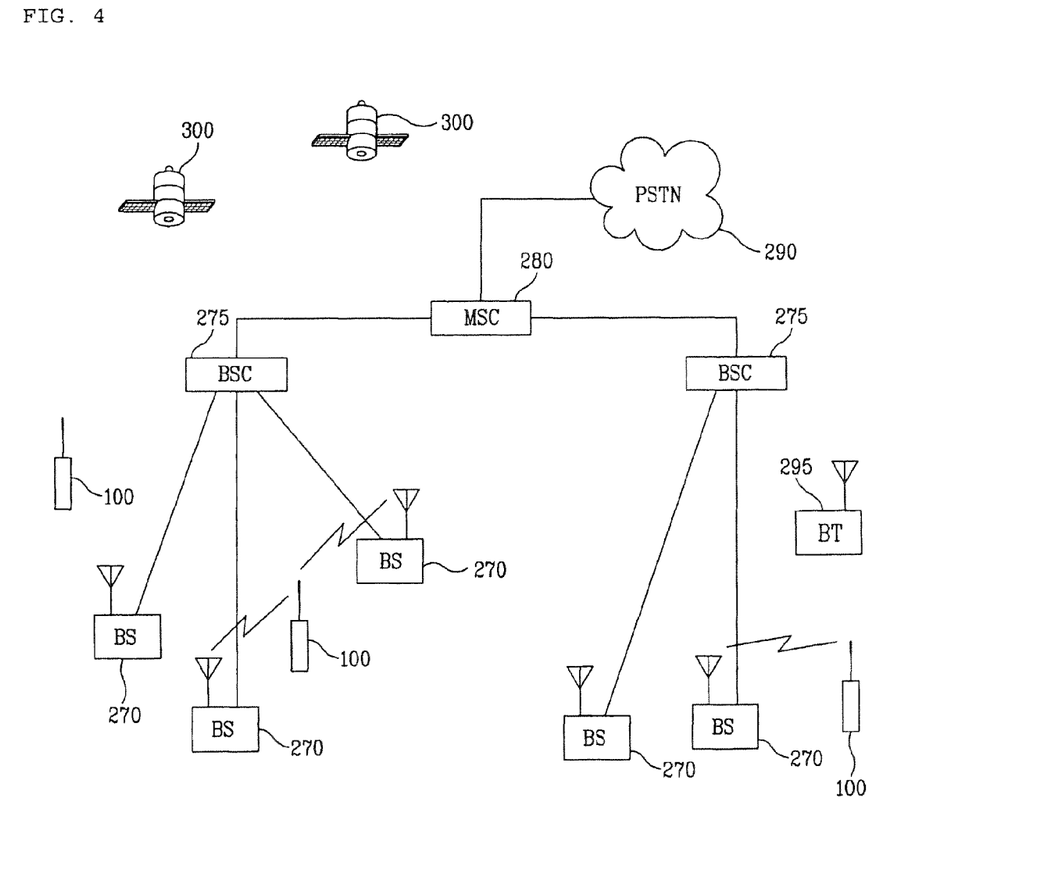
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

In the following description, a method of aligning data in the mobile terminal 100 according to one embodiment of the present invention is explained. In the following description, the mobile terminal 100 is provided with a touchscreen for example. According to one embodiment of the present invention, a user is able to change an alignment sequence of data through drag and drop. Such examples are shown FIG. 5 and FIG. 6.

Figure 5:
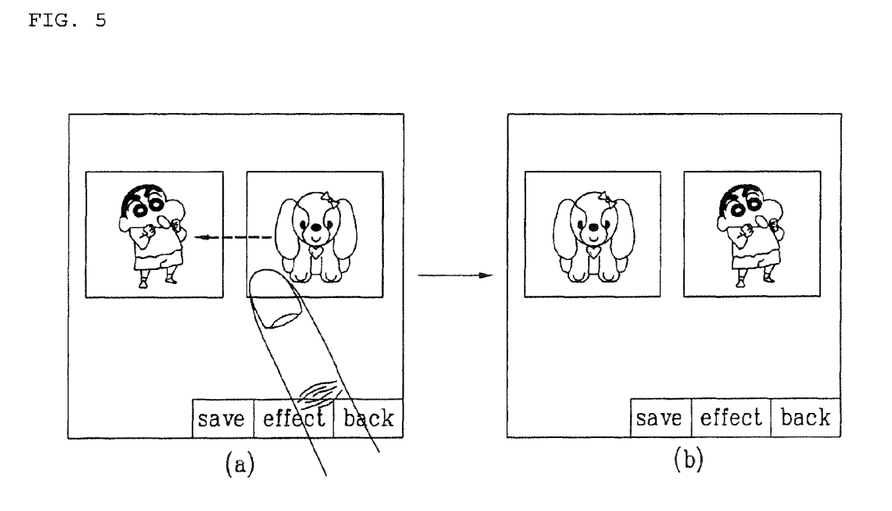
FIG. 5 and FIG. 6 are diagrams for a method of aligning data in a mobile terminal according to one embodiment of the present invention.

FIG. 5 is a diagram for a method of aligning data in a mobile terminal according to one embodiment of the present invention.

Referring to FIG. 5, two data files are displayed as thumbnails on the touchscreen [(a) of FIG. 5]. In this case, aligned positions of data can be mutually switched if a user touches and drags one of the displayed data to the other [(b) of FIG. 5].

Figure 6:
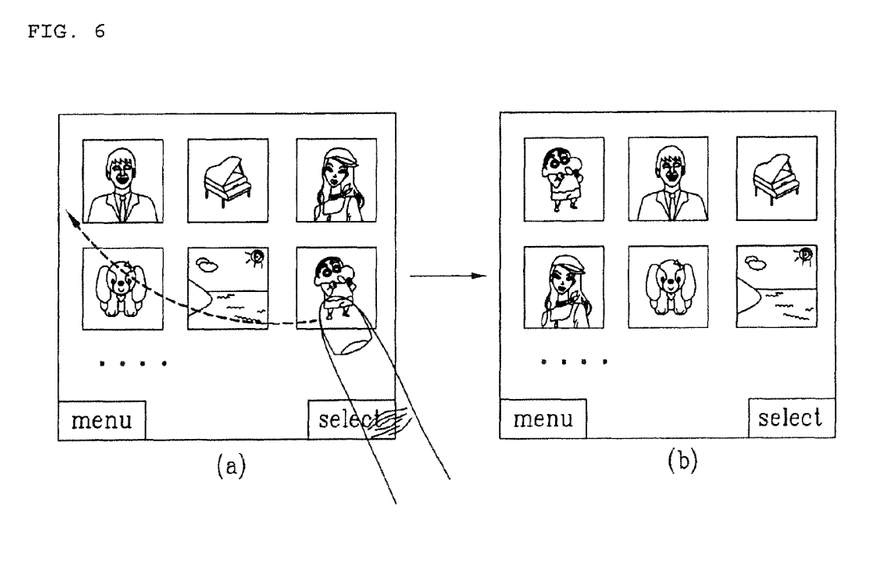

FIG. 6 is a diagram for another method of aligning data in a mobile terminal according to one embodiment of the present invention.

Referring to FIG. 6, a plurality of data files are displayed as thumbnails on the touchscreen [(a) of FIG. 6]. In this case, a user is able to drag a specific one of the displayed data files to a specific position by touching the specific data file. If so, the specific data file is aligned to the dragged position. For instance, if an $N^{th}$ data file is touched and dragged to a position in front of a first data file, the $N^{th}$ data file is aligned left to the first data file and the first data file is placed next to the $N^{th}$ data file. Namely, the $N^{th}$ data file is placed in the first place and the rest of the data files are placed by being pushed backward by one space (amounting to the area occupied by the $N^{th}$ data file) [(b) of FIG. 6].

In the following description, a method of editing data in a mobile terminal according to one embodiment of the present invention is explained. In the following description, the mobile terminal 100 is provided with a touchscreen for example. In particular, a method of generating a single data file by merging a plurality of data together is explained as follows.

Figure 7:
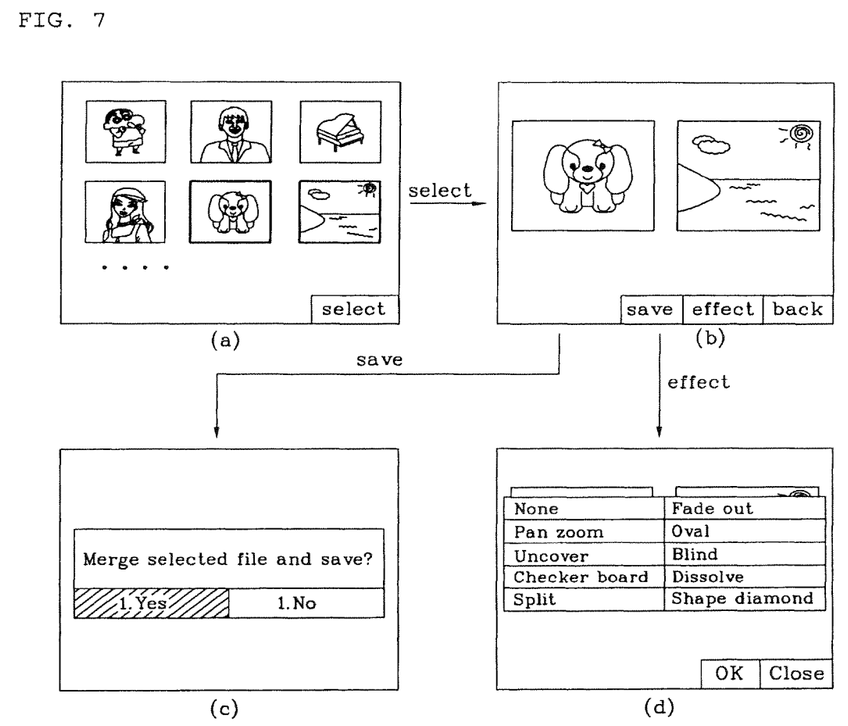
FIG. 7 and FIG. 8 are diagrams for a method of editing data in a mobile terminal according to one embodiment of the present invention.

FIG. 7 is a diagram for a method of editing data in a mobile terminal according to one embodiment of the present invention.

Referring to (a) of FIG. 7, a plurality of data are displayed as thumbnails on the touchscreen. A user is able to select data to merge by touching the displayed data. For instance, the user selects the data to merge by touching the data to merge and then touching 'select'.

Referring to (b) of FIG. 7, two selected data are displayed on the screen. In this case, assume that the selected two data are the data stored in video file format. In this disclosure, a video file means a data file containing audio and video signals. And, an audio file means a data file containing audio signal only without containing video signal. For instance, a video file includes a moving picture file and an audio file includes a music file. Play time of each of the selected two data and a total play time of the two data are displayed on the screen. In this case, a user may touch 'save' among menus displayed for the data mergence or may touch 'effect'. Besides, it is able to change alignment sequence of the selected two data using the method described with reference to FIG. 5.

If 'save' is touched on the screen shown in (b) of FIG. 7, an image shown in (c) of FIG. 7 can be displayed. If a user selects 'yes', the selected two data are sequentially merged together to generate a single data file. Therefore, if the generated data file is played back, the data are played back in the merged sequence. And, a play time is equal to a total of play times of the merged two data.

If 'effect' is touched on the screen shown in (b) of FIG. 7, an image shown in (d) of FIG. 7 can be displayed. In this case, 'effect' may mean a scene change effect for naturally changing images by giving various effects to a connecting part between two moving pictures A and B in merging the two moving pictures A and B differing from each other. In particular, the controller 180 is able to generate a single video file by performing a specific image processing on the connecting part between the selected two data. In this case, the specific image processing can include one of the followings.

First of all, 'fade out' means that a rear moving picture appears by getting brighter while a front moving picture disappears by getting blurred gradually. 'Pan zoom' means that a rear moving picture appears by ascending from a left bottom while a front moving picture disappears by ascending toward a right top. 'Oval' means that a front moving picture disappears as if enclosed by a black circle. 'Uncover' means that a rear moving picture appears while a front moving picture disappears as if uncovered from a right side. 'Blind' means that a rear moving picture appears while a front moving picture disappears as if pulling up a blind. 'Checker board' means that a front moving picture disappears while the front moving picture and a rear moving picture get overlapped with each other like a checker board. 'Dissolve' means that a rear moving picture appears while a front moving picture disappears by being broken into pieces.

Names are given to the above-mentioned specific image processings for convenience and may be changed occasionally. Besides, there are various examples for the image processings.

In (d) of FIG. 7, a user is able to generate a single data file from merging the selected two data by selecting one of the displayed scene change effects. Hence, if the generated data file is played back, the data are played in the merged sequence. Yet, the images are changed according to the selected effect at the part of connecting the selected data.

Meanwhile, the mobile terminal 100 according to one embodiment of the present invention is able to merge data by dragging & dropping data displayed on the touchscreen.

Figure 8:
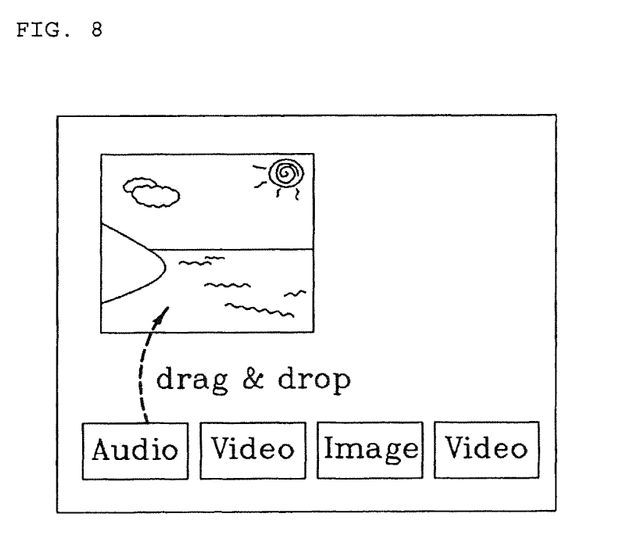

FIG. 8 is a diagram for a method of editing data in a mobile terminal 100 according to one embodiment of the present invention.

Referring to FIG. 8, a first data in a video file format is displayed as a thumbnail on a top of the screen, while other data (hereinafter named 'second data' for convenience) to be inserted in the first data are displayed on a bottom of the screen. A user is able to insert the second data in the first data by dragging the second data to the first data. In this case, the drag can be performed by a user's touch. Thus, the controller 180 is able to generate a single video file by inserting the dragged second data in the first data. Therefore, it is able to various kinds of video files according to a type or a dragged position of the dragged second data.

For instance, if the dragged second data is an audio file, it is able to generate a single video file by replacing an audio signal of the first data by an audio signal of the second data only. In case of playing back the generated video file, the audio signal can be outputted as soon as an output of a video signal of the first data starts, may be outputted by being delayed by a prescribed period of time, or may be outputted prior to the start of the output of the video signal of the first data.

If the dragged second data is a video file, it is able to generate a single video file by inserting the second data in the first data. In this case, it is able to adjust an inserted position of the second data by a prescribed part of the first data to which the second data is dragged.

For instance, if the second data is dragged to a left part of the first data, it is able to generate a video file having the second data inserted in a front part of the first data. In this case, if the generated video file is played back, the first data is played back after the second data has been played back.

For another instance, if the second data is dragged to a right part of the first data, it is able to generate a video file having the second data inserted in a rear part of the first data. In this case, if the generated video file is played back, the second data is played back after the first data has been played back.

According to one embodiment of the present invention, as mentioned in the foregoing description (in FIG. 7), the controller 180 is able to generate the single video file by performing a specific image processing on a connecting part between the first and second data.

Moreover, if the dragged second data is an image file, it is able to generate a video file in which an image of the second data and video of the first data are merged together. For instance, if the first data is a video file and if the second data is an image representing information relevant to the video file of the first data, this kind of video file generation is useful and can be applicable to various examples. Like the case that the second data is the video file, a position of inserting the second data can be adjusted by the dragged position as well.

Like the case that the second data is the video file, the controller 180 is able to generate the single video file by performing a specific image processing on the connecting part between the first and second data.

Meanwhile, in the mobile terminal 100 according to one embodiment of the present invention, if a single data file is generated by inserting a second data in a first data, a user is able to select a position for inserting the second data. In particular, the user selects a random point of the first data and then inserts the second data in the selected point. FIGS. 9 to 12 show the corresponding examples. In the following description, assume that first and second data are video files.

Figure 9:
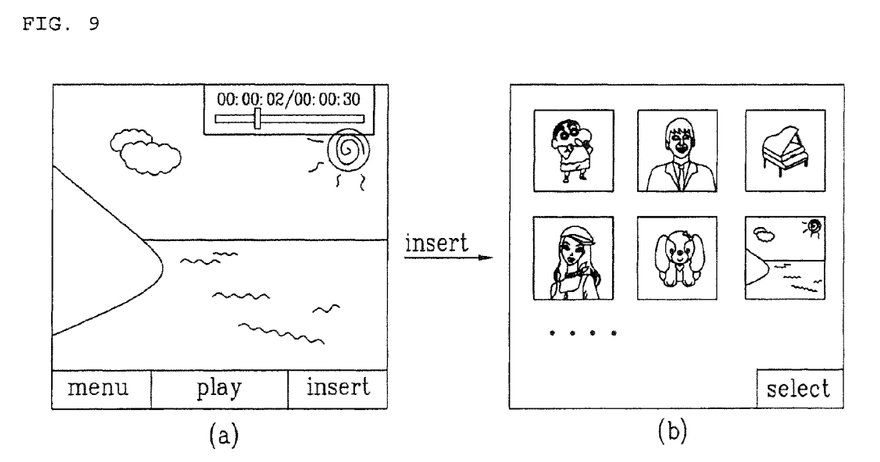
FIG. 9 is a diagram for a method of generating a single data file by inserting second data in a specific point of first data in a mobile terminal according to one embodiment of the present invention.

FIG. 9 is a diagram for a method of generating a single data file by inserting second data in a specific point of first data in a mobile terminal 100 according to one embodiment of the present invention.

Referring to (a) of FIG. 9, a first data is played back and then stops to show a predetermined still image at a specific point (e.g., specific play time). In this case, the specific point can be selected by a user by controlling a play function. If 'insert' is touched, an image shown in (b) of FIG. 9 can be displayed on the screen.

Referring to (b) of FIG. 9, an image of a second data, which can be inserted, is displayed as a thumbnail on the screen. Specific data to be inserted is selected from the displayed image by a touch. If so, the controller 180 is able to generate a single video file by inserting the selected second data in a specific point of the first data.

Therefore, if the generated video file is played back, the first data keeps being played back until the specific point and the second data then starts to be played back. After completion of the playback of the second data, the first data resumes to be played back from the specific point.

Figure 10:
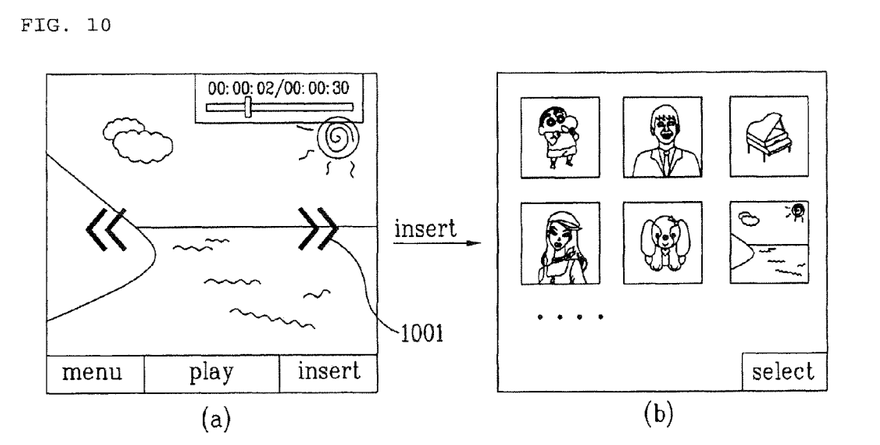
FIG. 10 is a diagram for a method of generating a single data file by inserting second data in a specific point of first data in a mobile terminal according to one embodiment of the present invention.

FIG. 10 is a diagram for another method of generating a single data file by inserting second data in a specific point of first data in a mobile terminal 100 according to one embodiment of the present invention.

Referring to (a) of FIG. 10, a first data is played back and then stops to show a predetermined still image at a specific point (e.g., specific play time). In this case, while a playback of the first data is temporally stopped, the controller 180 is able to display direction buttons 1001 for a selection for an insertion point of the second data. Therefore, a user is able to select a point for inserting the second data using the direction buttons 1001.

For instance, by touching the right direction button 1001 displayed on a right part of the screen, the screen can be shifted to a further played image from the temporarily stopped image. By touching the left direction button 1001 displayed on a right part of the screen, the screen can be shifted to a previously played image from the temporarily stopped image. Moreover, by a count of pressing the direction button 1001, it is able to adjust a shift speed or length of an image. For instance, if the direction button 1001 is touched once, the image is shifted by 1× speed. If the direction button 1001 is touched twice, the image is shifted by 2× speed.

In the screen shown in (a) of FIG. 10, if 'insert' is touched, an image shown in (b) of FIG. 10 can be displayed on the screen.

Referring to (b) of FIG. 10, a second data, which can be inserted, is displayed as a thumbnail on the screen. A specific data is selected from the displayed image by a touch. If so, the controller 180 is able to generate a single video file by inserting the selected second data in a selected point of the first data.

Therefore, if the generated video file is played back, the first data is played back until the selected point. The second data is then played back. After completion of the playback of the second data, the first data resumes to be played back from the specific point.

Figure 11:
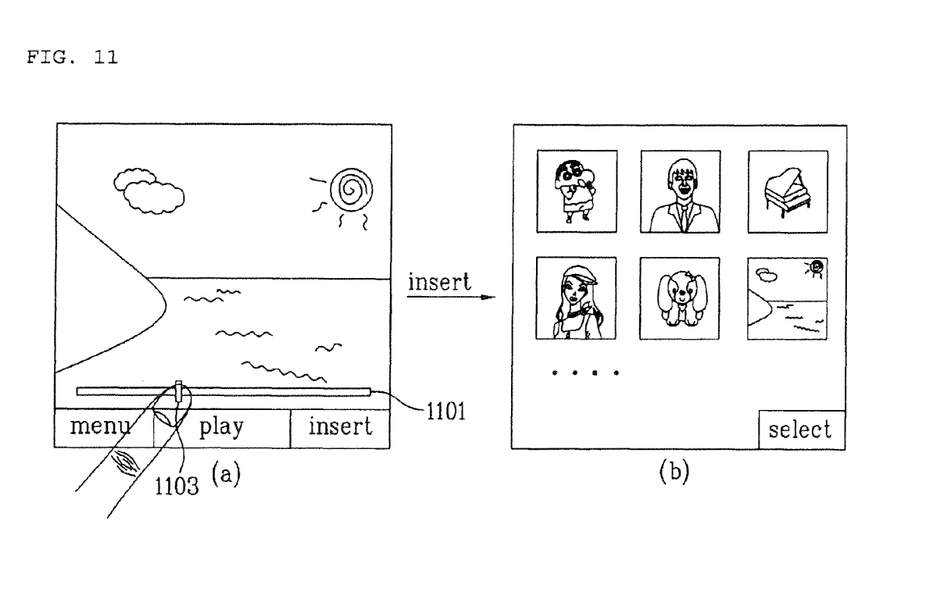
FIG. 11 is a diagram for a method of generating a single data file by inserting second data in a specific point of first data in a mobile terminal according to one embodiment of the present invention.

FIG. 11 is a diagram for another method of generating a single data file by inserting second data in a specific point of first data in a mobile terminal 100 according to one embodiment of the present invention.

Referring to (a) of FIG. 11, a first data is played back and then stops to show a predetermined still image at a specific point (e.g., specific play time). In this case, while a playback of the first data is temporally stopped, the controller 180 is able to adjust an insertion point for the second data by shifting an icon 1103 represented on a bar 1101 for indicating a play point of the first data. A user touches and drags the icon 1103 to shift.

In the screen shown in (a) of FIG. 11, if 'insert' is touched, an image shown in (b) of FIG. 11 can be displayed on the screen.

Referring to (b) of FIG. 11, a second data, which can be inserted, is displayed as a thumbnail on the screen. A specific data is selected from the displayed image by a touch. If so, the controller 180 is able to generate a single video file by inserting the selected second data in a selected point of the first data. Therefore, if the generated video file is played back, the first data is played back until the selected point. The second data is then played back. After completion of the playback of the second data, the first data resumes to be played back from the specific point.

Figure 12:
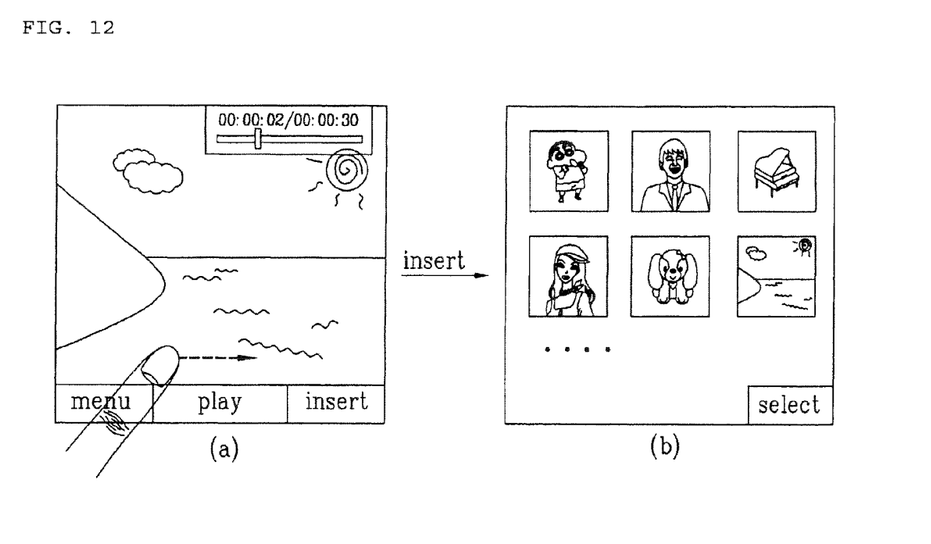
FIG. 12 is a diagram for a method of generating a single data file by inserting second data in a specific point of first data in a mobile terminal according to one embodiment of the present invention.

FIG. 12 is a diagram for another method of generating a single data file by inserting second data in a specific point of first data in a mobile terminal 100 according to one embodiment of the present invention.

Referring to (a) of FIG. 12, a first data is played back and then stops to show a predetermined still image at a specific point (e.g., specific play time). In this case, while a playback of the first data is temporally stopped, the controller 180 is able to adjust an insertion point for the second data by dragging a specific point of the image displayed on the screen.

In the screen shown in (a) of FIG. 12, if 'insert' is touched, an image shown in (b) of FIG. 12 can be displayed on the screen.

Referring to (b) of FIG. 12, a second data, which can be inserted, is displayed as a thumbnail on the screen. A specific data is selected from the displayed image by a touch. If so, the controller 180 is able to generate a single video file by inserting the selected second data in a selected point of the first data.

Therefore, if the generated video file is played back, the first data is played back until the selected point. The second data is then played back. After completion of the playback of the second data, the first data resumes to be played back from the specific point.

In the single video file generated by the above-mentioned method, specific image processing may be performed on a connecting part between the first and second data (described with reference to FIG. 7). For instance, 'fade out' processing may be formed on the data connecting part in the generated video file.

Figure 13:
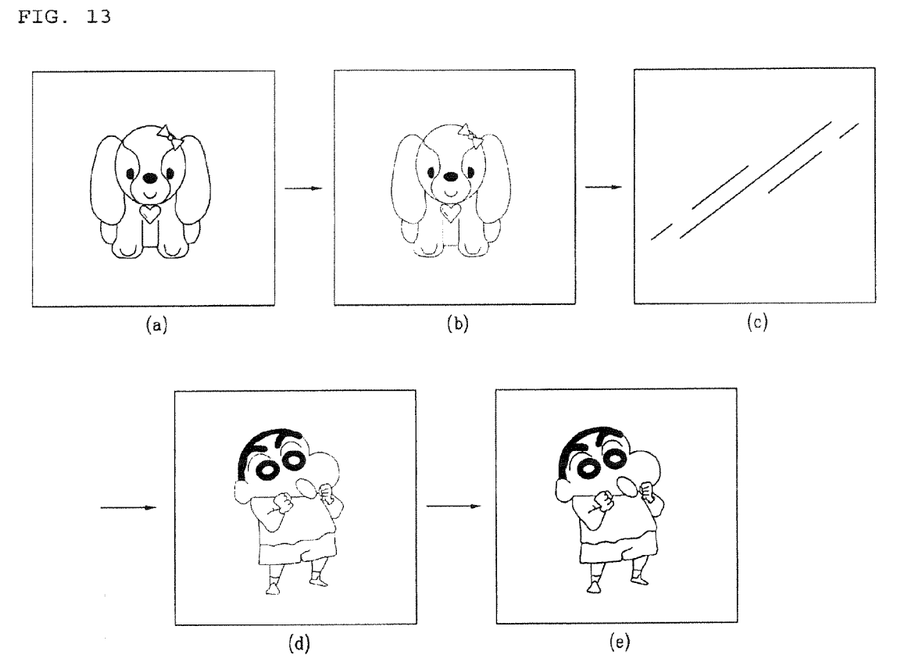
FIG. 13 is a diagram of a screen for playing a single data file generated from merging a plurality of data in a mobile terminal according to one embodiment of the present invention.

FIG. 13 is a diagram of a screen for playing a single data file generated from merging a plurality of data in a mobile terminal 100 according to one embodiment of the present invention.

Referring to FIG. 13, after a video signal of a first data has disappeared by getting blurred gradually [(a) to (c) of FIG. 13], a second data gradually appears [(d) and (e) of FIG. 13].

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal 100.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen configured for displaying a first thumbnail related to a first data file and a second thumbnail related to a second data file; and
a controller configured for generating a single data file comprising the first data file and the second data file when the second thumbnail is touched and dragged to the first thumbnail,
wherein the generated single data file includes the first data file and the second data file in sequential order, the order based on a dragged position of the second thumbnail on the touchscreen in relation to the first thumbnail, and
wherein the controller is further configured for:
adjusting an insertion position of the second data file in relation to the first data file in the generated single data file based on the dragged position of the second thumbnail; and
performing a specific image processing on a connecting part between the first data file and the second data file when generating the single data file.

2. The mobile terminal of claim 1, wherein:
the first data file is a video file comprising audio signals and video signals;
the second data file is an audio file; and
the controller is further configured for replacing the audio signals of the first data file with the audio signals of the second data file in the generated single data file.

3. The mobile terminal of claim 1, wherein:
the first data file is a video file;
the second data file is an image file or a video file; and
the generated single data file is a single video file having the second data file inserted into the first data file.

4. A mobile terminal comprising:
a touchscreen configured for displaying a first thumbnail related to a first data file; and
a controller configured for generating a single data file by inserting a second data file at a selected position of the first data file,
wherein the single data file includes the first data file and the second data file in sequential order, and
wherein the controller is further configured for:
adjusting an insertion position of the second data file in relation to the first data file in the generated single data file based on the selected position of the first data file; and
performing a specific image processing on a connecting part between the first data file and the second data file when generating the single data file.

5. The mobile terminal of claim 4, wherein the controller is further configured for:
controlling playback of the first data file;
controlling a temporary stop of the playback of the first data file; and
controlling the touchscreen to display a direction button for receiving input of the selected position for inserting the second data file into the first data file when the playback of the first data file is temporarily stopped.

6. The mobile terminal of claim 4, wherein the controller is further configured for:

controlling playback of the first data file;

controlling the touchscreen to display a bar to indicate a playback time of the first data file and to display an icon on the bar to indicate a playback position of the first data file; and adjusting the selected position for inserting the second data file into the first data file by shifting a position of the icon on the bar.

7. The mobile terminal of claim 4, wherein the controller is further configured for:

controlling playback of the first data file;

controlling a temporary stop of the playback of the first data file;

controlling the touchscreen to display an image of the first data file when the playback of the first data file is temporarily stopped;

receiving a dragging input, via the touchscreen, at a specific position of the displayed image; and adjusting the selected position for inserting the second data file into the first data file in response to the dragging input.

8. A method of editing data in a mobile terminal, the method comprising:

displaying a first thumbnail related to a first data file and a second thumbnail related to a second data file on a touchscreen of the mobile terminal;

detecting, via a controller of the mobile terminal, a touch and drag input of the second thumbnail to the first thumbnail; and generating, via the controller, a single data file comprising the first data file and the second data file based on the detected touch and drag input;

adjusting, via the controller, an insertion position of the second data file in relation to the first data file in the generated single data file based on the dragged position of the second thumbnail; and performing, via the controller, a specific image processing on a connecting part between the first data file and the second data file when generating the single data file, wherein the generated single data file includes the first data file and the second data file in sequential order, the order based on a dragged position of the second thumbnail on the touchscreen in relation to the first thumbnail.

* * * * *